United States Patent [19]

Kauffman et al.

[11] 4,036,925
[45] July 19, 1977

[54] CONTINUOUS STRETCH BLOW MOLDING METHOD

[75] Inventors: Ivan L. Kauffman, Commerce; Robert C. Kellogg, Hartland, both of Mich.

[73] Assignee: Monsanto Company, St. Louis, Mo.

[21] Appl. No.: 647,069

[22] Filed: Jan. 7, 1976

Related U.S. Application Data

[62] Division of Ser. No. 415,851, Nov. 14, 1973.

[51] Int. Cl.$^2$ .......................................... B29C 17/07
[52] U.S. Cl. ................................. 264/94; 425/529; 425/534; 425/540
[58] Field of Search ................... 264/89, 90, 92, 94, 264/96–99; 425/DIG. 203, DIG. 208, DIG. 211, DIG. 213, DIG. 216, DIG. 232

[56] References Cited

U.S. PATENT DOCUMENTS

| | | | |
|---|---|---|---|
| 2,792,593 | 5/1957 | Hardgrove, Jr. | 425/384 |
| 3,149,373 | 9/1964 | Marzillier | 264/94 X |
| 3,415,915 | 12/1968 | Lecluyse et al. | 264/94 |
| 3,776,991 | 12/1973 | Marcus | 264/89 |

FOREIGN PATENT DOCUMENTS

| | | | |
|---|---|---|---|
| 1,104,113 | 2/1968 | United Kingdom | 264/94 |
| 1,315,205 | 5/1973 | United Kingdom | |

*Primary Examiner*—Jan H. Silbaugh
*Attorney, Agent, or Firm*—Michael J. Murphy

[57] ABSTRACT

A continuous process for forming hollow, molecularly oriented articles which comprises: gravity-dropping molded preforms at molecular orientation temperature onto upwardly disposed moving stretch pin assemblies continuously presented at a loading station such that after loading, a closed end is above an open end of each preform, conveying the loaded assemblies into operative position between separated sections of continuous and synchronously moving molds, distending the preforms upwardly via stretch pin members and circumferentially via pressurized air after mold closing and while the preforms are at molecular orientation temperature in order to form the articles, opening the continuously moving molds, conveying the stretch pin assemblies with the upwardly disposed articles thereon away from the molds toward a removal station where the articles are removed from the assemblies without interrupting assembly movement generally back toward the loading station where the unloaded assemblies are again presented for receipt of additional preforms.

9 Claims, 8 Drawing Figures

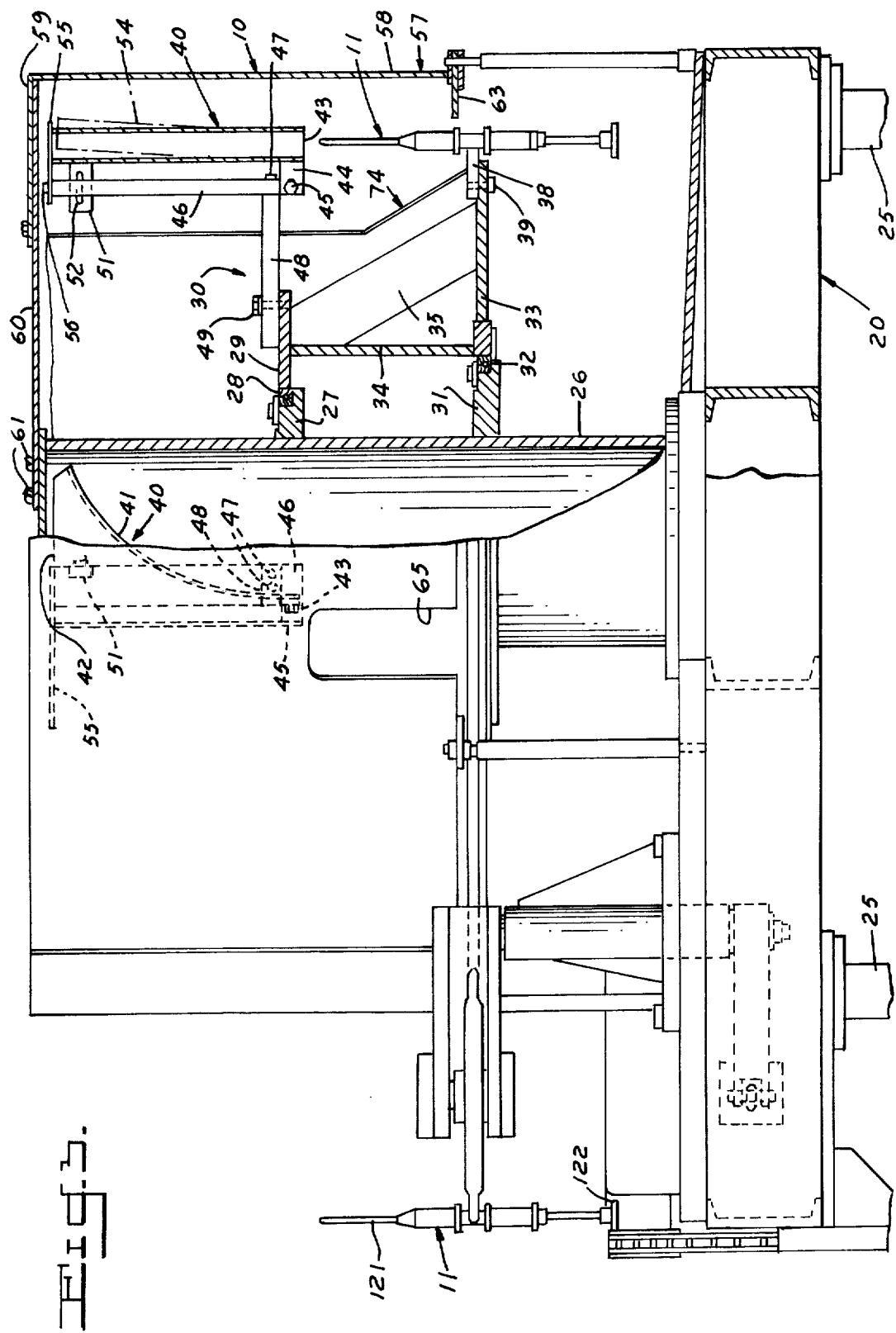

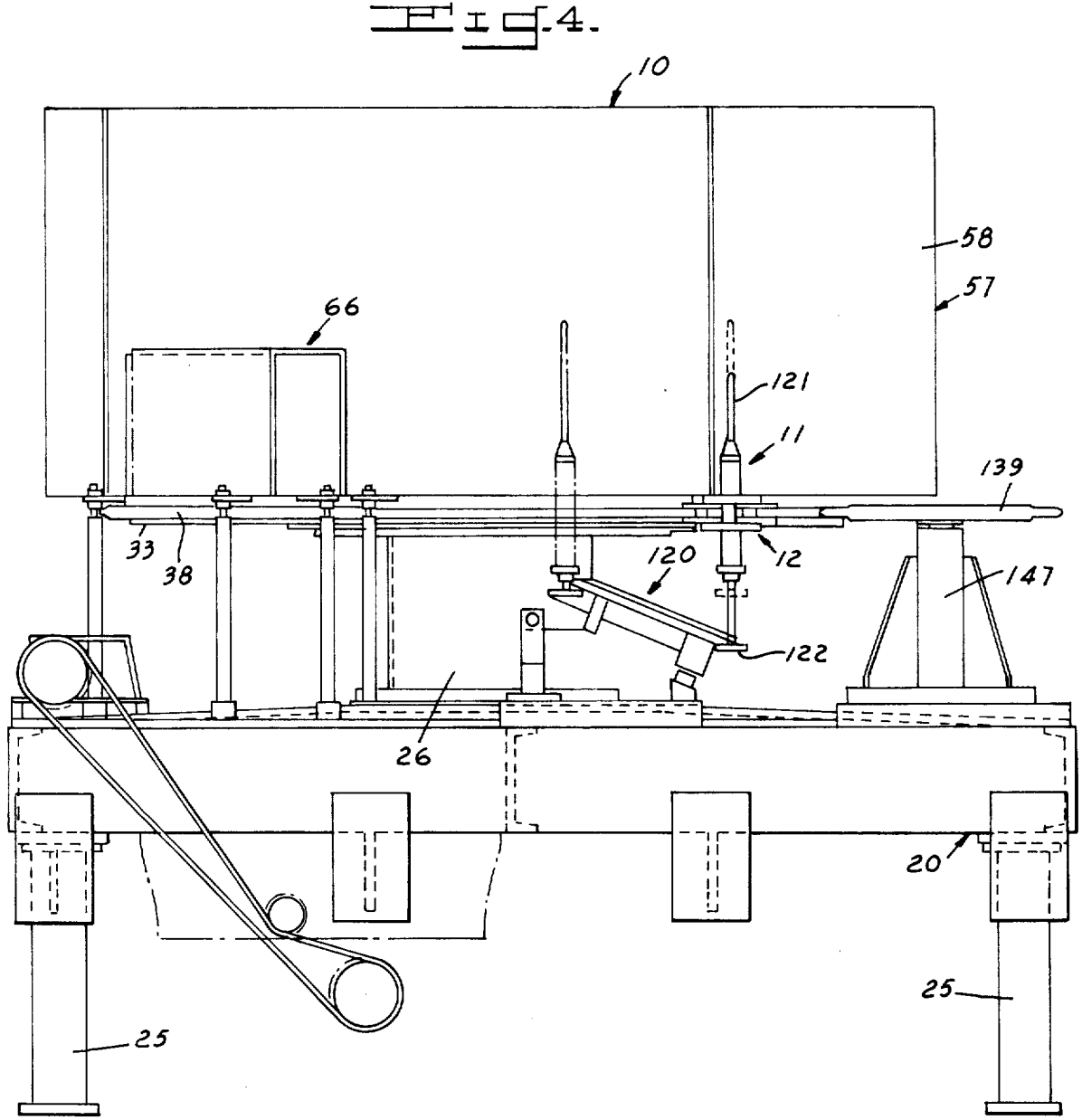

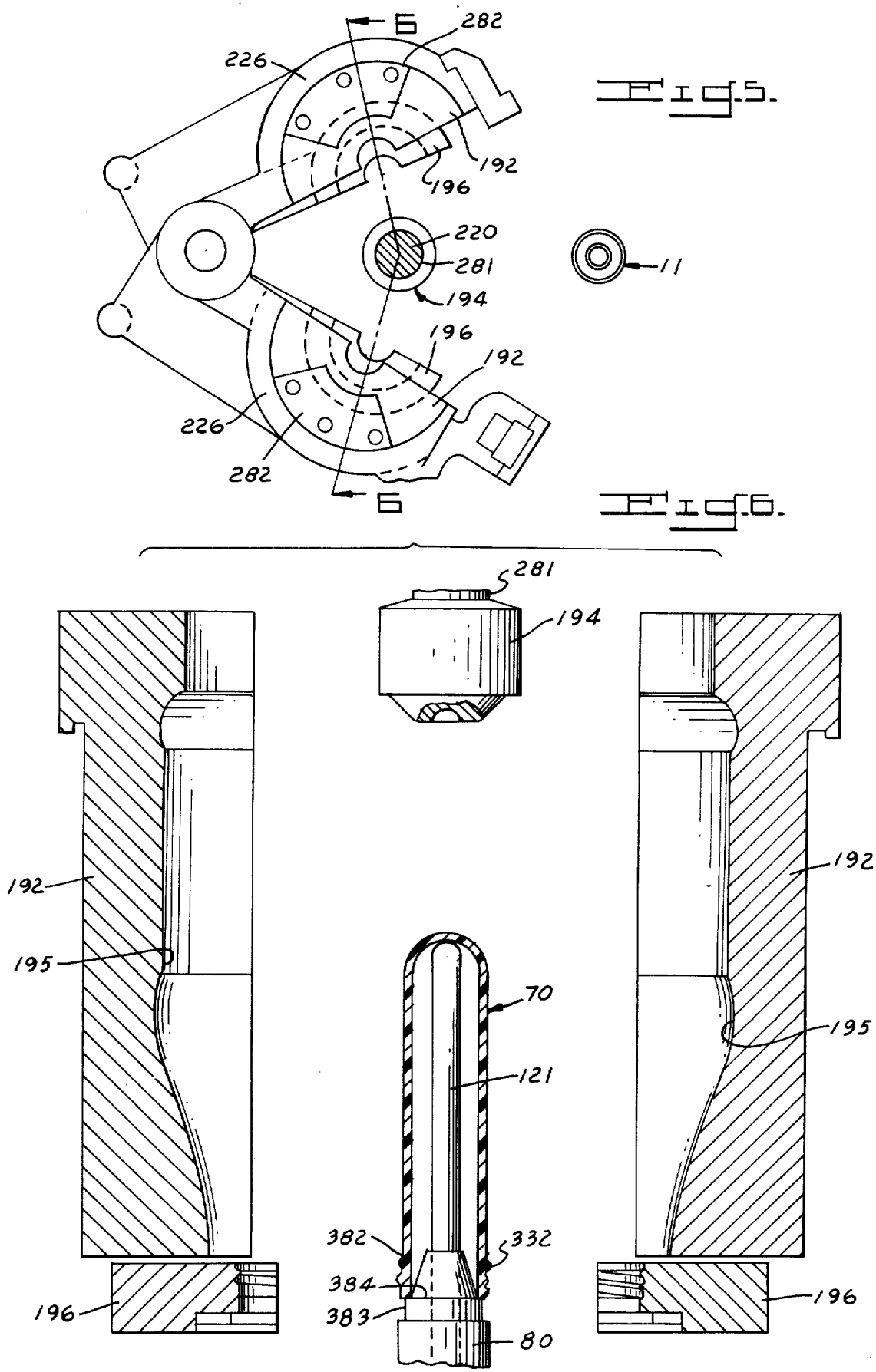

CONTINUOUS STRETCH BLOW MOLDING METHOD

SUMMARY OF THE INVENTION

This is a division of copending application Ser. No. 415,851, filed Nov. 14, 1973.

This invention relates to the stretch blow molding art, and more particularly, to a continuous motion stretch blow molding method for blow molding hollow articles from tubular parisons or preforms. Heretofore, various types of processes have been proposed for blow molding preformed parisons to form hollow articles. A disadvantage of such prior art processes is that they involve indexing operations which render them incapable of high speed fabrication of hollow articles to supply the present day need for low cost production of such articles.

Accordingly, in view of the aforegoing, it is an important object of the present invention to provide a novel and improved continuous motion stretch blow molding process which overcomes the aforementioned disadvantages of the prior art blow molding systems.

It is another object of the present invention to provide a novel and improved continuous motion stretch blow molding process which is capable of high speed fabrication of hollow articles at a low cost.

It is still another object of the present invention to provide novel process improvements for loading parisons onto a moving stretch pin means for subsequent stretching, blowing and cooling operations.

It is still a further object of the present invention to provide a novel and improved continuous motion stretch blow molding process which includes an ejection system for automatically ejecting previously formed blow molded articles.

Other objects, features and advantages of this invention will be apparent from the following detailed description, appended claims, and the accompanying drawings.

These and other objects are accomplished in a continuous process for blow molding hollow articles which involves repeatedly carrying out in an uninterrupted manner the steps of loading preforms onto conveyor-mounted carriers in a loading station, routing the loaded carriers to molding stations, blow molding the preforms into the articles in the molding stations, removing the articles from the carriers in a discharge station and returning the carriers again to the loading station, by providing the improvement in the loading step of such process which comprises gravity-dropping molded preforms at molecular orientation temperature onto upwardly disposed moving stretch pin assemblies continuously presented at the loading station and subsequently at the molding stations such that after loading, a closed end is above an open end of each preform.

BRIEF DESCRIPTION OF THE DRAWINGS

FIG. 3 is a fragmentary, broken, elevational, section view of the structure illustrated in FIG. 1, taken along the line 3—3 thereof, and looking in the direction of the arrows.

FIG. 4 is a fragmentary, elevational, section view of the structure illustrated in FIG. 1, taken along the line 4—4 thereof, and looking in the direction of the arrows.

FIG. 5 is a top view of the mold employed in the present invention, showing the mold halves swung to an open position for the reception of a parison.

FIG. 6 is a fragmentary, enlarged, elevational section view of the mold structure illustrated in FIG. 5 taken along the line 6—6 thereof, and looking in the direction of the arrows.

DESCRIPTION OF THE PREFERRED EMBODIMENT

The blow molding process of the present invention is arranged to provide continuous, high speed fabrication of hollow, molecularly oriented thermoplastic articles, such as bottles and the like, and comprises repeatedly carrying out the steps of gravity-dropping molded preforms at molecular orientation temperature onto upwardly disposed moving stretch pin assemblies continuously presented at a loading station such that after loading a closed end is above an open end of each preform, conveying the loaded assemblies into operative position between separated sections of continuous and synchronously presented moving molds, distending the preforms upwardly via stretch pin members and circumferentially via pressurized air after mold closing and while the preforms are at molecular orientation temperature in order to form the articles, opening the continuously moving molds, conveying the stretch pin assemblies with the upwardly disposed articles thereon away from the molds toward a removal station where the articles are removed without interrupting assembly movement generally back toward the loading station where the unloaded assemblies are again presented for receipt of additional preforms.

General Machine Description For Carrying Out The Process

Figure 1:
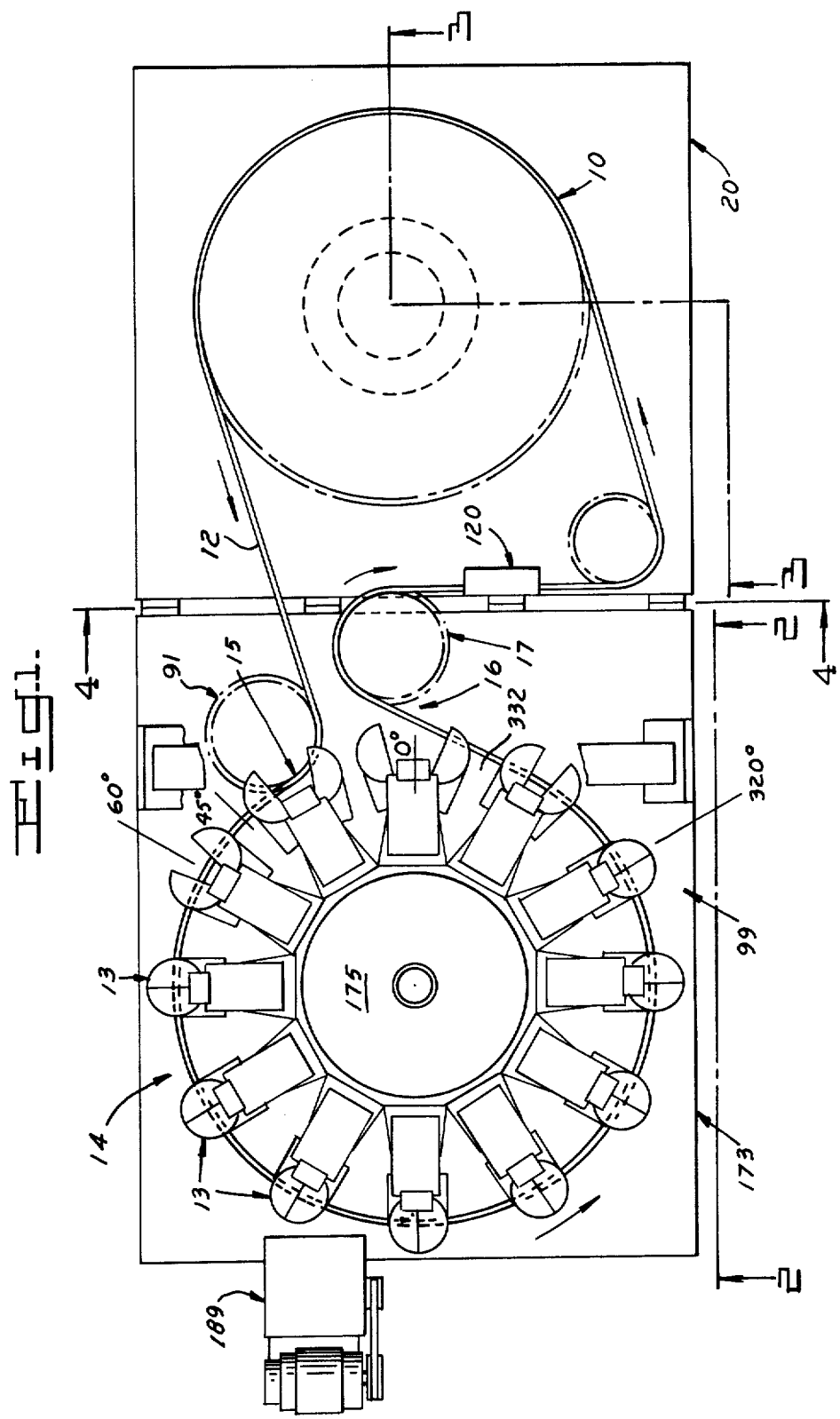
FIG. 1 is a schematic top plan view of a rotary stretch blow molding apparatus capable of carrying out the process of the present invention.
Figure 2:
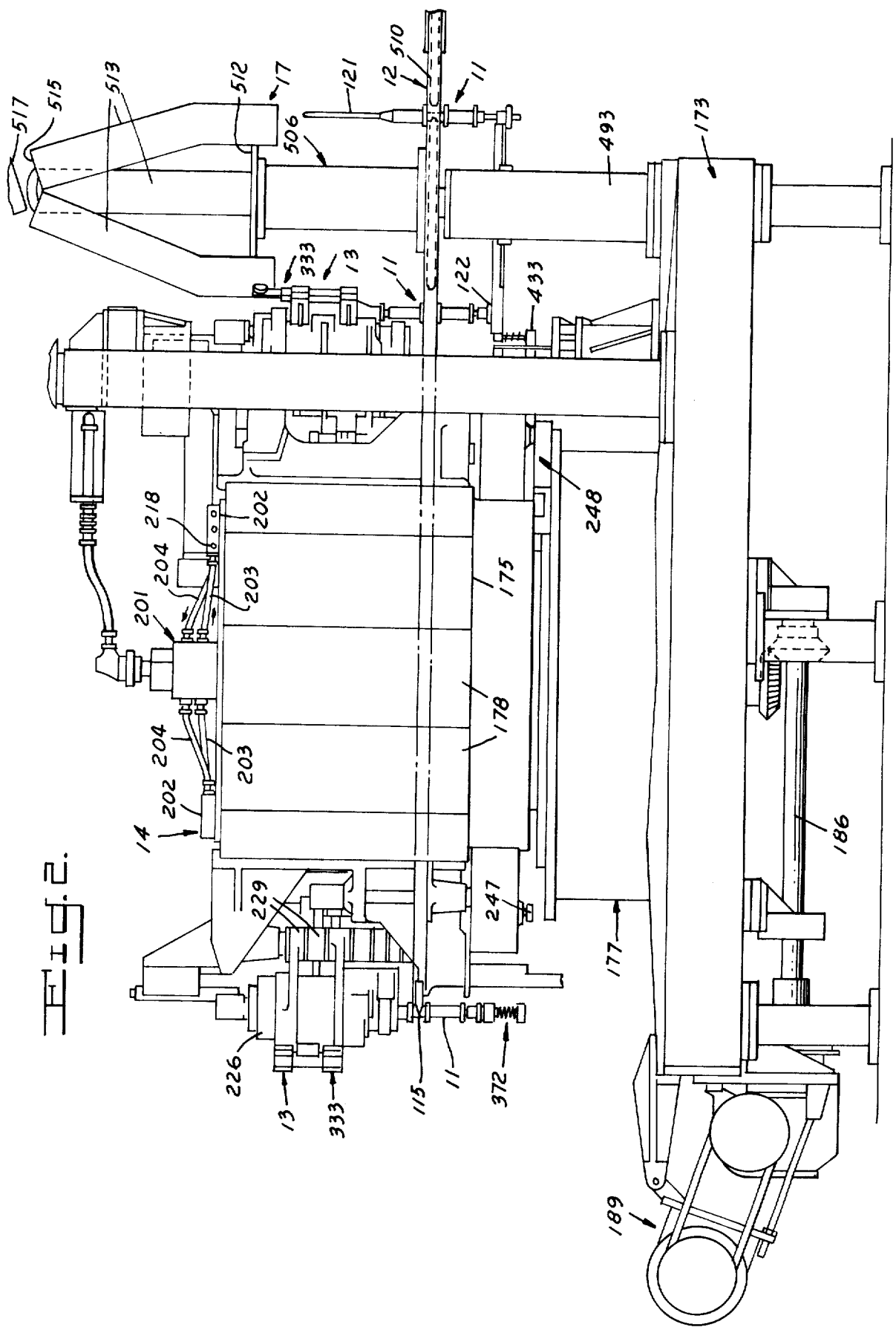
FIG. 2 is a fragmentary, enlarged, elevational view of the structure illustrated in FIG. 1, taken along the line 2—2 thereof, and looking in the direction of the arrows.

Referring now to the drawings, and in particular to FIG. 1 which is a top plan view of a continuous machine operable in accordance with the principles of the present invention, the numeral 10 generally designates a multi-station parison loading turret which receives heated tubular parisons and loads them in a predetermined sequence onto individual stretch pin assemblies of the type generally indicated by the numeral 11 in FIG. 2. The stretch pin assemblies 11 are operatively mounted on a constant speed transfer means, generally indicated by the numeral 12, and which comprises a continuous standard pitch roller chain. The tubular parisons or preforms are located longitudinally and transversely on the stretch pin assemblies 11. The transfer means 12 conveys the stretch pin assemblies 11 at a constant speed into operative positions within individual molding stations 13 on a multi-station blow molding rotary turret, generally indicated by the numeral 14 in FIGS. 1 and 2. The rotary turret 14 rotates at constant speed and moves the stretch pin assemblies 11 between a loading position 15 and an unloading position 16, as shown in FIG. 1. While at molecular orientation temperature, the parisons are stretched longitudinally, blown to the final form of an article, such as a bottle, and then cooled, between the load and unload positions 15 and 16, respectively. The transfer means 12 conveys each of the stretch pin assemblies 11 with its formed article from its respective molding station 13 at the unloading position 16 and thence around an article ejection means, generally indicated by the numeral 17 in FIGS. 1 and 2 in a removal station.

The process of the present invention is applicable for the formation of hollow thermoplastic articles, such as bottles and other containers. Any suitable thermoplastic resin can be used in forming the parisons. Examples of a suitable resin would include polymers and copolymers of polypropylene. The resin may be extruded or molded into the parisons or preforms, and cooled to a temperature below their cystalinefreezing point. The parisons are then heated in a suitable oven to a plastic stage or molecular orientation temperature and conveyed by suitable means to the aforedescribed parison loading rotary turret 10.

The systems for forming the parisons, and for heating and conveying the parisons to the loading rotary turret 10, do not form any part of this invention, and any suitable such systems may be employed.

Parison Loading Rotary Turret

As shown in FIGS. 3 and 4, the parison loading rotary turret 10 is operatively mounted on a suitable base, generally indicated by the numeral 20, which is supported by four ground-engaging legs 25. Turret 10 includes a tubular fixed column 26 (FIG. 3) fixedly mounted in a central position on the base 20. A circular flange 27 is fixedly mounted on the column 26 by any suitable means, as by welding, at a position spaced downwardly from the upper end of the column. The flange 27 operatively supports a circular bearing means 28 on which is rotatably supported a horizontal, radially extended upper circular carrier plate 29 which forms a part of a rotary carrier member, generally indicated by the numeral 30. A second circular flange 31 is fixed on the column 26 at a point spaced apart downwardly from the flange 27, and it operatively supports a second circular bearing means 32. A lower circular carrier plate 33 is rotatably supported on the bearing means 32, and it is fixedly joined to the upper carrier plate 29 by a cylindrical support member 34. The carrier plates 29 and 33 are further interconnected by a plurality of circumferentially disposed vertical support arms 35.

As shown in FIGS. 3 and 4, a circular sprocket 38 is fixedly mounted by suitable machine screws 39 on the lower carrier plate 33. The sprocket 38 is operatively engaged for a distance of about 180° around the periphery thereof, by the chain of the transfer means 12. The constant speed of the transfer means 12 is thus imparted to the rotary carrier 30 and it moves with the transfer means 12.

The parison loading rotary turret 10 includes ten loading stations, each of which is provided with a loading chute generally indicated by the numeral 40 (FIG. 3). Each of the parison loading chutes 40 is adjustably mounted on the carrier member 30. As shown in FIG. 3, the side view of a loading chute 40 shown the chute to be substantially gun holster shaped, with the leading edge 41 being arcuately formed in the shape of a parabola. The upper end 42 of each parison loading chute 40 is open and the lower end 43 is open. A support arm 44 is fixedly secured to the lower end of each of the loading chutes 40. Each support arm 44 is pivotally attached by means of a suitable machine screw 45 to the lower end of a vertical support bar 46 which is secured by a pair of machine screws 47 to the outer end of a horizontal support arm 48. Each of the support arms 48 is fixedly secured by a pair of machine screws 49 to the upper side of the upper carrier plate 29.

As shown in FIG. 3, an adjustment bracket 51 is fixedly secured, as by welding, to the upper inner side of each of the chutes 40. Each of the brackets 51 is provided with a horizontal slot 52 through which is passed a suitable bolt and nut means for adjustably securing the bracket 51 to the upper end of the vertical support bar 46. It will be seen that the bolt and nut means and the screw means 45 can be loosened so as to permit adjustment of each chute 40 radially inward or outward to a desired adjusted position, as indicated by the broken line position designated by the numeral 54 in FIG. 3. A spacer plate 55 is operatively mounted between each of the chutes 40, adjacent the upper ends thereof. The spacer plates 55 are fixedly secured by suitable bolts 56 to the upper ends of the support bars 46.

As shown in FIGS. 3 and 4, the parison loading rotary turret 10 is provided with an outer fixed shroud, generally indicated by the numeral 57, which includes an outer cylindrical, vertical wall 58 which has integrally formed on the upper end thereof a horizontal and inwardly extended circular wall 59. The shroud upper wall 59 is secured to the column 26 by a plurality of horizontal support arms 60 which have their inner ends connected by suitable machine screws 61 to the upper end of the column 26, and their outer ends connected by suitable machine screws 62 to the shroud upper wall 59. The fixed shroud 57 includes a lower horizontal circular wall 63, as shown in FIG. 3, which extends inwardly from the lower end of the wall 58 to a point adjacent the path of the stretch pin means 11 as they pass around the rotary carrier member 30. As shown in FIG. 3, the shroud vertical wall 58 is provided with an entrance opening 65 for the passage therethrough of the stretch pin means 11 as they are conveyed into the shroud 57 by the transfer means 12.

As shown in FIG. 3, the fixed shroud 57 has fixedly connected thereto an exit tunnel, generally indicated by the numeral 66, out through which pass the stretch pin means 11 after they have been loaded with a parison. As shown in FIG. 6, each of the stretch pin means 11 exits from the parison loading rotary turret 10 with an inverted parison, generally indicated by the numeral 70, mounted on the upper end thereof. The parisons 70 are substantially test tube shaped and they have a closed end and an opposite open end around which is formed a thread indicated by the numeral 71.

As shown in FIG. 3, the rotary carrier member 30 supports a moving heat shield, generally indicated by the numeral 74, which is secured at its lower end to the lower carrier plate 33, and to support arms 48. The shrouds 58 and 74 function to prevent heat loss from the parisons 70 to the surrounding atmosphere as the parisons are conveyed through the loading rotary turret 10 and into a mold station 13 on the molding turret 14.

The heated parisons 70 may be dropped by any suitable means, as for example a plurality of parisons such as five at a time may be carried by a horizontal pallet and then sequentially gravity-dropped, one at a time, in an inverted position into one of the chutes. The chutes 40 are adjusted so that they are timed to receive a parison 70 at a predetermined drop position. The chutes 40 are constructed and arranged so as to be able to receive parisons 70 dropped at a number of points along a straight line, as for example ten parison drop points. The parisons 70 are dropped in a predetermined sequence so that each one falls into the high end of the parabola shaped end 41 of each of the chutes 40 and then falls down the face of the parabola shaped wall 41, strikes the vertical back wall portion of the chute 40, is then captured in the lower narrow neck of the lower funnel shaped end of the chute, and then passes through the lower open end 43 and onto a stretch pin assembly 11 which is timed to be disposed under the open end 41 of each chute 40 as the parison passes vertically downwardly therethrough. Chain 12 passes around the idler input means 91 and thence around the molding rotary turret 14. The idler means 91 times the chain 12 so as to bring the stretch pin assemblies 11 into operative engagement with a molding circular sprocket, generally indicated by the numeral 115 in FIG. 2. Turret sprocket 115 is provided with a suitable notch, not shown, at each of the molding stations 13, for locating and for reception of a stretch pin assembly 11.

As shown in FIG. 1, the transfer means chain 12 passes around the molding rotary turret 14 and then carries the stretch pin assemblies 11 off of the molding turret 14 and tangentially onto and around the rotary ejector means 17, which will be further described hereinafter. The transfer chain 12 carries the stretch pin assemblies 11 from the ejection means 17 into operative engagement with a cam means 120 (FIG. 4) for slidably camming the stretch pin 121 downwardly to an initial parison receiving lower position. As shown in FIG. 4, each of the stretch pin assemblies 11 is then carried by the chain 12 through cam means 120 which engages the circular block 122 and moves said block and the stretch pin 121 downwardly from the dotted line position to the solid line position shown therein.

Molding Rotary Turret

As shown in FIG. 2, the molding rotary turret 14 includes a rotary turret 175 which is rotatably mounted by suitable bearings on a support pedestal and column 177 carried on the base 173. Turret 175 is provided with 12 vertical flat mounting areas 178 at each of which is operatively mounted one of the molding stations 13.

Machine drive shaft 186 (FIG. 2) is operatively connected to and driven by a suitable electric motor power drive means, generally indicated by the numeral 189. Power drive means 189 provides the constant drive speed for the entire machine through the co-action of the chain means 12.

Each of the molding stations 13 on the molding rotary turret 14 is provided with a five-piece mold. As shown in FIGS. 5 and 6, the mold at each station 13 includes a pair of neck ring clamps 196 plus a pair of side pieces or mold halves indicated by the numerals 192 which are semi-circular in cross section and are provided at the upper end thereof with semi-circular central openings in which is operatively received the mold bottom end cap or end plug 194. The mold side pieces 192 each have a cavity 195 formed therein for molding an article, which in this instance comprises a bottle. The inner face of the mold end plug 194 is shaped to form the bottom end of the bottle.

The aforedescribed mold parts are water cooled and are supplied with cooling water from a rotary manifold generally indicated by the numeral 201 (FIG. 2) and mounted on top of the turret 178. Coolant water is conducted from the rotary manifold 201 to a plurality of individual manifolds 202, one for each of the molding stations 13, through conduits 203. The water is returned to the rotating manifold 201 from each of the manifolds 202 through a suitable conduit 204. Cooling water is conducted from the manifolds 202 to the mold halves 192, then passes through suitable passages formed in the mold halves 192, exits through the outlet ports and passes through return conduits to manifold 202. Cooling water may also be supplied to each of the mold bottom end plugs 194 from its respective manifold 202 through suitable conduit 218.

Each of the mold halves 192 is releasably secured to its respective mold carrier 226 (FIG. 2). Each such mold carrier 226 is provided with a pair of hubs 229 on its inner side which are pivotally mounted by suitable bearing means on a vertical support shaft.

As shown in FIG. 2, mold actuator cam 248 is fixedly mounted on the supporting pedestal and column structure 177. The mold actuator cam 248 is arcuate in plan view, and it is horizontally disposed so as to operate to open the mold pieces 192 for ejection of a completed article and for receiving a parison, and then to close the mold pieces 192 again for the molding cycle. The mold actuator cam 248 is provided with a cam track which is formed to move the cam follower 247 for the appropriate camming operations as the molding rotary turret 14 turns in a counterclockwise direction, as viewed in FIG. 1. As in FIG. 1, the zero degree position of the molding rotary turret 14 is shown to be disposed at a point in the rotary travel of the molding turret 14 where the transfer means chain 12 is passing away from the molding rotary turret 14 and onto the ejector means 17. When a molding station 13 is moved to the 45° position shown in FIG. 1, the cam follower 247 is cammed by the track to move the mold pieces 192 to a partially closed position. At the 60° position, the cam track 249 begins to operate on the cam follower 247 to move the mold pieces 192 to the closed position. Continued movement then moves the cam follower 247 out of the cam track during the stretching and blow molding operation. When a molding station reaches the 320° point of travel shown in FIG. 1, the cam follower 247 is again actuated by the cam track to commence opening the mold pieces. The opening is maintained until the 332° point of rotary travel is reached, at which time the mold pieces are fully opened.

As seen in FIGS. 5 and 6, a plug carrier shaft 220 is provided with a reduced diameter portion or neck 281 at a point above the mold plug 194. A pair of arcuate plug clamps 282 are adapted to be laterally moved into a clamping position around the neck 281 of the plug carrier shaft 220 for positively positioning and retaining the mold plug 194 at a specific location during an article molding operation. Mold plug clamps 282 are plates secured to the upper ends of the mold halves 192.

The mold halves 192 are locked in the closed blow molding position by a mold latch, generally indicated by the numeral 333 in FIG. 2.

As shown in FIG. 2, each of the molding stations 13 on the molding rotary turret 14 is provided with a stretch pin actuator means, generally indicated by the numeral 372.

Stretch Pin Means

The stretch pin means or assembly 11 includes the stretch pin body 80 (FIG. 6) through which is longitudinally and slidably mounted the stretch pin 121. The uppper end of an assembly 11 extends beyond the upper end of the stretch pin body 80, and is provided with conical upper end surface 382 which functions as a bushing for guiding an inverted parison 70 downwardly over the upper end of the stretch pin 121 when the parison is loaded on the stretch pin 121, as the stretch pin passes around the parison loading rotary turret 10. The conical upper end surface 382 terminates at its lower end in a radial flange 383 and the upper surface 384 of flange 383 forms a shelf or seat for the threaded end 332 of a parison 70.

Stretch Pin Transfer Means

The stretch pin transfer means includes the continuous standard pitch roller chain 12 which passes around the parison loading turret 10, and the molding turret 14, and around the ejection means 17. The chain 12 is driven at a constant speed which is commensurate with the machine speed. As shown in FIG. 1, the transfer means chain 12 leaves the parison loading rotary turret 10, and then passes to the left and around an input idler means, generally indicated by the numeral 91, which guides the chain 12 so as to bring it in tangent to the molding turret 14, and to properly insert each of the stretch pin assemblies 11 into its respective mold assembly 13.

Ejection Means

As shown in FIG. 1, the transfer chain 12 conveys the stretch pin assemblies 11 carrying finished articles away from the molding transfer rotary turret 14 and into operative engagement with an ejection means generally indicated by the numeral 17. As shown in FIG. 2, ejection means 17 includes a column 493 fixed on a plate secured to base 173. A transfer air supply tube, not shown, extends upwardly through bores formed through base 173, and such tube is connected to a suitable source of pressurized transfer air.

A rotary turret, generally indicated by the numeral 506, is rotatably mounted on an inner shaft, not shown, by suitable bearing means. Turret 506 includes a circular plate to which is fixedly connected a chain sprocket 510 for supporting chain 12.

Turret 506 carries a fixed plate 512 on the upper end thereof to which is fixedly secured, three transfer chutes 513 which are spaced about the rotary turret 506 at evenly spaced positions approximately 120° apart. The lower ends of the chutes 513 are opened, and they are each positioned over an article ejection station on the chain carrying sprocket 510. The upper ends 515 are open and converge at the open lower end 516 of an upwardly directed funnel eject chute 517. The upper end of the converging funnel-shaped chute 517 is open and it is adapted to direct an article to a succeeding article processing machine, such as a transfer conveyor or the like.

When the transfer chain 12 conveys a stretch pin assembly 11 from the molding rotary turret 14 to the transfer means 17, one of three transfer air valves, now shown, but evenly spaced around sprocket 510 supporting chain 12 is arranged to be positioned with a fitting thereof disposed adjacent a transfer air inlet port of a stretch pin assembly 11. The sprocket 510 is provided with three notches in which are received the stretch pin assemblies, and the transfer chutes 513 are also positioned to coact with such transfer air valves. As the stretch pin assemblies 11 are conveyed around the ejection means 17 by the sprocket 510, cam rollers on the valves pass over a raised cam portion for a rotary distance of about 40° during which time pressurized transfer air is admitted through the respective valve so as to blow off the finished article 397 upwardly through a respective chute 513 and into chute 517. The latter may also be provided with a vacuum to ensure passage of the finished article 397 through the chute 517 to a succeeding processing operation.

Operation

In use, power drive means 189 rotates the molding rotary turret 14 and drives the transfer chain 12, which in turn drives the parison loading rotary turret 10. As the transfer chain 12 moves a stretch pin assembly 11 onto the parison loading rotary turret 10, the stretch pin assembly is disposed under one of the loading chutes 40. As each stretch pin assembly 11 moves under the parison loading position, it has a parison 70 loaded onto its stretch pin 121. More specifically, from a process standpoint, a molded preform 70 at molecular orientation temperature is gravity-dropped onto one of a series of upwardly disposed moving stretch pin assemblies continuously presented at the loading station such that after loading, the closed end is above the open end of the preform as illustrated in FIG. 6. During such loading, each preform guidedly passes through one of the continuously moving open-ended chutes 40 onto an assembly 11 which is timed to be disposed substantially beneath the open lower end of the chute as the preform passes downwardly therethrough. As the latter mounts assembly 11, the wall surrounding its open end is guided downwardly along conical surface 382 (FIG. 6) into concentric position with respect to a pin 121 which is then in its retracted preform-receiving position. Continued movement of the transfer chain 12 moves the preform-loaded stretch pin assembly 11 around the input idler means 91 and into operative location as shown in FIG. 6, in one of the molding stations 13 between separated sections of the continuously and synchronously presented moving molds. The sprocket 115 on the molding turret 14 locates a stretch pin assembly 11 in each molding station 13.

Figure 8:
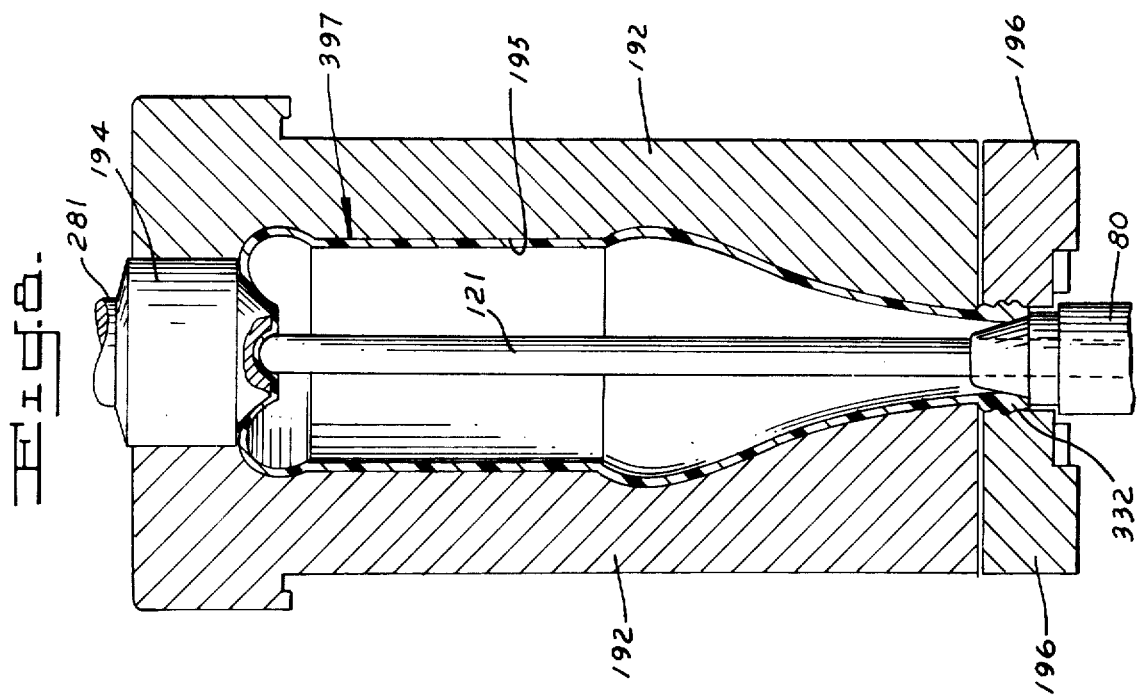
FIG. 8 is a view similar to FIG. 7, but showing the parison blown into a final bottle shape.
Figure 7:
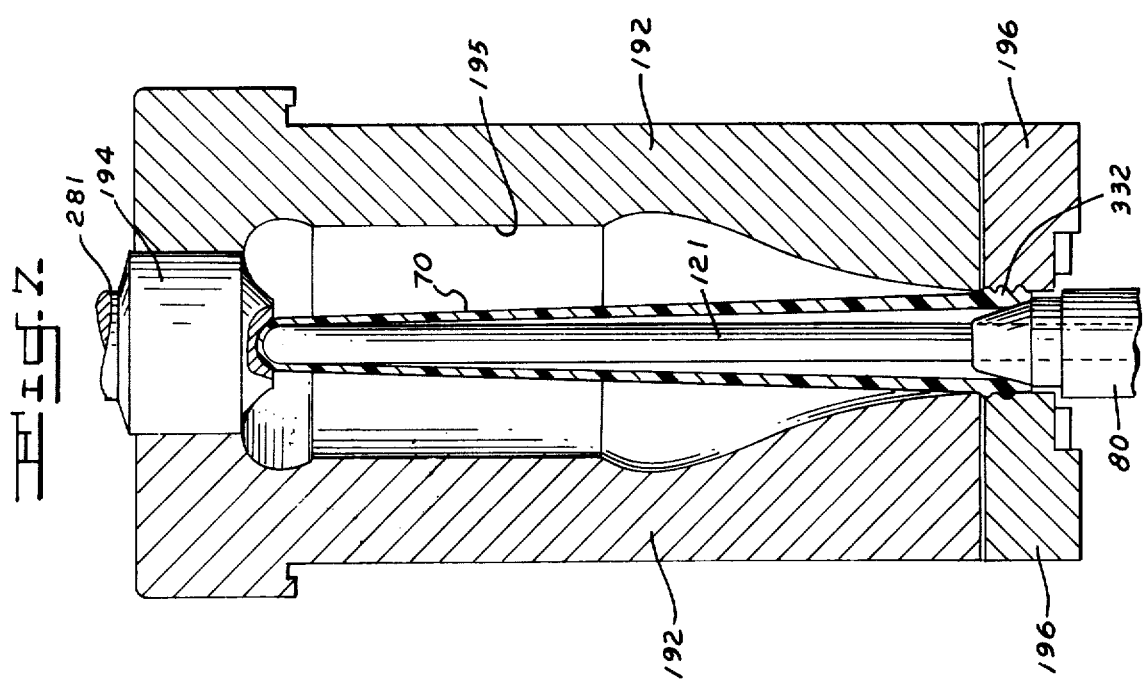
FIG. 7 is a view similar to FIG. 6, but with the mold sections moved to a closed position prior to admission of air for blowing a bottle from the parison.

The neck clamps 196, mold halves 192 and end plug 194 are then synchronously moved together to their closed positions, as shown in FIG. 7. Stretch pin 121 is then moved upwardly by a suitable stretch pin actuator means so as to distend and stretch the parison upwardly thereon until it engages the mold end plug 194, as shown in FIG. 7. The blow air is then actuated at the 90° point of rotary movement of the molding rotary turret 14, and blowing continues until the 293° point. During such distension, the preform is at molecular orientation temperature and the blowing action blows the parison 70 outwardly into final formed article 397, as shown in FIG. 8, whereupon it is chilled through contact with the walls of the mold cavity. Continued movement of the particular continuously moving molding station 13 then causes the plural sections to separate to open the mold. The particular stretch pin assembly 11 with the upwardly disposed article 397 thereon is then conveyed or moved away from the open mold toward the removal station and ejector means 17, where the article is removed from the assembly. During movement between the molding and removal stations, stretch pin 121 is retained in the extended position of FIG. 8 within the article with its forward end seated in a depression in a base of such article. Removal from an assembly 11 occurs by forcibly ejecting each article upwardly via pressurized transfer air and eventually into eject chute 517 while the assembly continues moving generally back toward the loading station. The stretch pin assembly 11 passes next through cam means 120 (FIG. 4) which moves or retracts the stretch pin 121 downwardly to the initial parison receiving position, whereupon the unloaded stretch pin assembly is then moved to the parison loading position for another cycle.

It will be seen that as a stretch pin assembly 11 moves around the molding rotary turret 14, that the parison 70 carried thereon is stretched, blown, chilled and finally ejected from the machine by the ejection means 17.

While it will be apparent that the preferred embodiment of the invention herein disclosed is well calculated to fulfill the objects above stated, it will be appreciated that the invention is susceptible to modification, variation and change.

What is claimed is:

1. A continuous process for forming hollow molecularly oriented articles which comprises repeatedly carrying out the steps of:
  a. gravity-dropping molded preforms at molecular orientation temperature through continuously moving open-ended guide chutes onto upwardly disposed moving stretch pin assemblies continuously presented at a loading station and timed to be disposed substantially beneath an open end of a chute as the preform passes vertically downwardly therethrough such that after loading, a closed end is above an open end of each preform;
  b. conveying the loaded stretch pin assemblies into operative position between separated sections of continuously and synchronously presented moving molds;
  c. closing mold sections on the loaded stretch pin assemblies;
  d. distending said preforms upwardly via stretch pin members and circumferentially via pressurized air after closing said sections and while the preforms are at molecular orientation temperature to form said articles;
  e. separating the sections to open the continuously moving molds;
  f. conveying the stretch pin assemblies with the upwardly disposed articles thereon away from the open molds toward a removal station;
  g. removing the articles from the stretch pin assemblies in the removal station while continuing assembly movement generally toward the loading station; and
  h. presenting unloaded stretch pin assemblies at the loading station for receipt of additional preforms.

2. The process of claim 1 wherein the stretch pin members are kept extended after forming the articles and during movement toward the removal station.

3. The process of claim 2 including the step of retracting the stretch pin members to preform-receiving positions after passing through the removal station and while continuing toward the loading station.

4. The process of claim 1 wherein step g) is accomplished by forcibly ejecting each article upwardly off a stretch pin assembly into an eject chute.

5. The process of claim 1 wherein step c) is accomplished by synchronously moving at least three mold sections with respect to each other into molding position.

6. The process of claim 1 wherein during loading, each preform is guided downwardly along a conical guide surface into concentric position with respect to a retracted stretch pin of an assembly.

7. The process of claim 1 wherein during step f the stretch pin members are in extended position with their forward ends seated in depressions in bases of the articles.

8. In a continuous process for blow molding hollow articles which involves repeatedly carrying out in an uninterrupted manner, the steps of loading preforms onto conveyor-mounted carriers in a loading station, routing the loaded carriers to molding stations, blow molding the preforms into the articles in the molding stations, removing the articles from the carriers in a discharge station and returning the carriers again to the loading station, the improvement in the loading step of such process which comprises gravity-dropping molded preforms at molecular orientation temperature through continuously moving open-ended guide chutes onto upwardly disposed moving stretch pin assemblies continuously presented at the loading station and timed to be disposed substantially beneath an open end of a chute as the preform passes vertically downwardly therethrough such that after loading, a closed end is above an open end of each preform.

9. The process of claim 8 wherein between the blow molding and removing steps stretch pin members of the stretch pin assemblies are in extended position with their forward ends seated in depressions in bases of the articles.

* * * * *